US012713211B2

(12) United States Patent
Barawkar et al.

(10) Patent No.: US 12,713,211 B2
(45) Date of Patent: Aug. 18, 2026

(54) MESSAGING FOR IMS-CAPABLE DEVICES

(71) Applicant: T-MOBILE INNOVATIONS LLC, Overland Park, KS (US)

(72) Inventors: Kunal Prakash Barawkar, Bothell, WA (US); John Paul Tuscano Cruz, Renton, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 483 days.

(21) Appl. No.: 18/116,034

(22) Filed: Mar. 1, 2023

(65) Prior Publication Data

US 2024/0298149 A1 Sep. 5, 2024

(51) Int. Cl.

| | |
|---|---|
| ***H04W 4/14*** | (2009.01) |
| ***H04L 65/1016*** | (2022.01) |
| ***H04W 8/20*** | (2009.01) |
| ***H04W 60/04*** | (2009.01) |

(52) U.S. Cl.

CPC .......... *H04W 4/14* (2013.01); *H04L 65/1016* (2013.01); *H04W 8/20* (2013.01); *H04W 60/04* (2013.01)

(58) Field of Classification Search

CPC ......... H04W 4/14; H04W 8/20; H04W 60/04; H04L 65/1016; H04L 65/1073

See application file for complete search history.

(56) References Cited

U.S. PATENT DOCUMENTS

| | | | | |
|---|---|---|---|---|
| 2017/0332217 | A1* | 11/2017 | Youtz | H04W 72/51 |
| 2021/0360567 | A1* | 11/2021 | Tiwari | H04W 60/04 |

* cited by examiner

*Primary Examiner* — Eric Myers

(74) *Attorney, Agent, or Firm* — SHOOK, HARDY & BACON L.L.P.

(57) ABSTRACT

Systems and methods are provided to provide messaging for IP Multimedia Subsystem (IMS)-capable user equipment (UE). Subscription data can be used to confirm that the UE is appropriately configured for messaging via short message service (SMS) function and that the UE is IMS-capable. SMS over non-access stratum (SMSoNAS) is a backup method of message delivery for IMS-capable UEs and SMSoIMS is the preferred method of message delivery for IMS-capable UEs. Once it is verified that the UE is IMS-capable, the present invention disables SMSoNAS communication for the IMS-capable UE to avoid additional signaling and capacity impact to the network.

18 Claims, 6 Drawing Sheets

MESSAGING FOR IMS-CAPABLE DEVICES

SUMMARY

The present disclosure is directed, at least in part, to blocking SMS over Non-Access Stratum (SMSoNAS) on 5G for IMS-capable devices to reduce a load on telecommunication networks, substantially as shown in and/or described in connection with at least one of the figures, and as set forth more completely in the claims.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
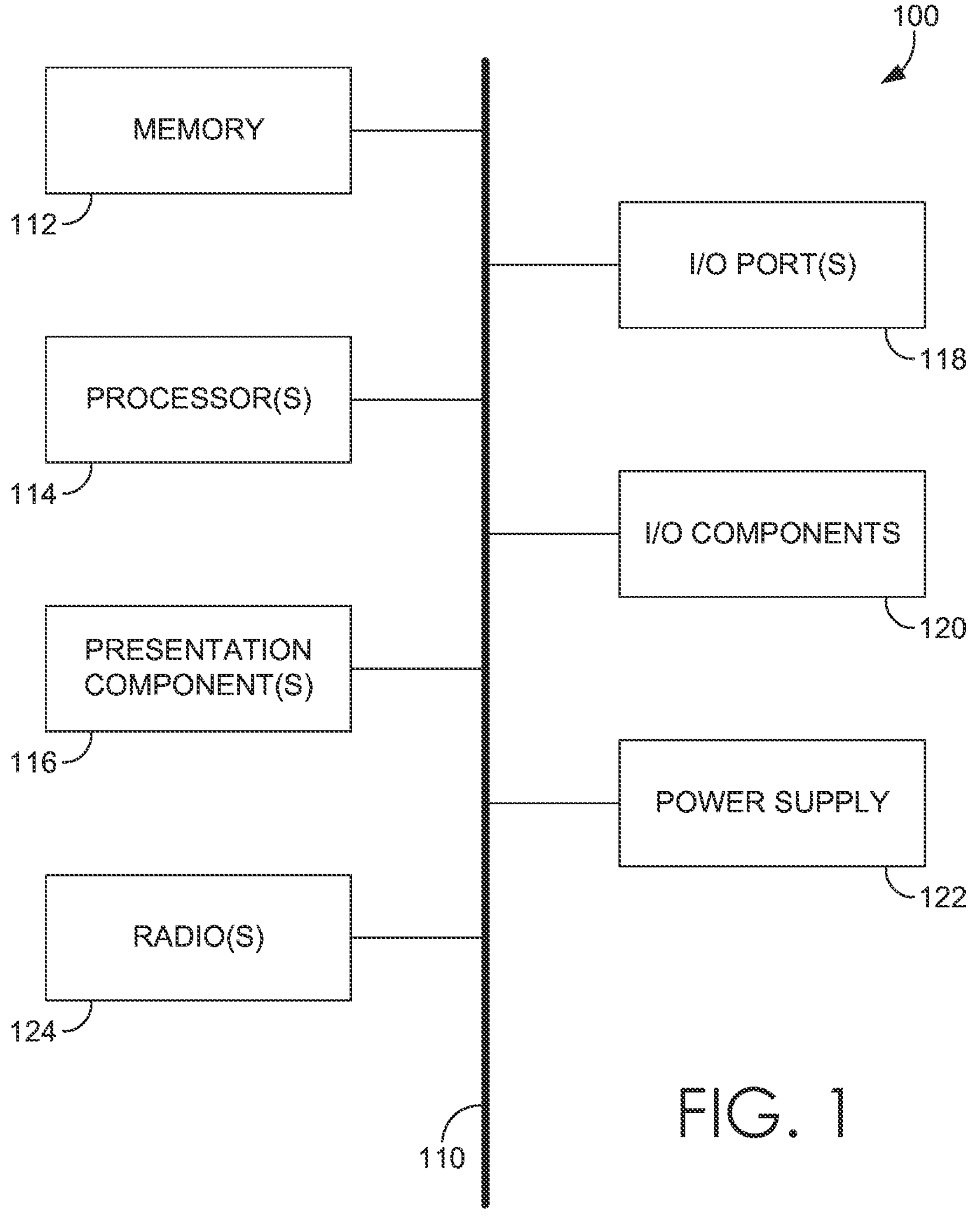
FIG. 1 depicts an exemplary computing device suitable for use in implementation of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. These acronyms and shorthand notations are intended to help provide an easy methodology of communicating the ideas expressed herein and are not meant to limit the scope of the present invention. The following is an exemplary list of some of these acronyms:

| Acronym | Meaning |
|---|---|
| 3G | Third-Generation Wireless Access Technology |
| 4G | Fourth-Generation Wireless Access Technology |
| 5G/5G NR | Fifth-Generation Wireless Access Technology/ New Radio |
| 5GC | Fifth-Generation Wireless Access Technology Core Network |
| AAU | Active Antenna Unit |
| BRS | Broadband Radio Service |
| CD-ROM | Compact Disk Read Only Memory |
| CDMA | Code Division Multiple Access |
| eNodeB | Evolved Node B |
| EVDO | Evolution-Data Optimized |
| gNodeB/gNB | Next Generation Node B |
| gNB CU | Next Generation Node B Central Unit |
| gNB DU | Next Generation Node B Distribution Unit |
| GPRS | General Packet Radio Service |
| GSM | Global System for Mobile Communications |
| IDEN | Integrated Digital Enhanced Network |
| DVD | Digital Versatile Disc |
| EEPROM | Electrically Erasable Programmable Read-Only Memory |
| FD-MIMO | Full Dimension Multiple-Input Multiple-Output |
| IOT | Internet of Things |
| IIOT | Industry Internet of Things |
| LED | Light Emitting Diode |
| LTE | Long Term Evolution |
| MEC | Mobile Far Edge Computer |
| MIMO | Multiple-Input Multiple-Output |
| mMIMO | Massive Multiple-Input Multiple-Output |
| MMU | Massive Multiple-Input Multiple-Output Unit |
| NEXRAD | Next-Generation Radar |
| NR | New Radio |
| OTN | Optical Transport Network |
| PC | Personal Computer |
| PCS | Personal Communications Service |
| PDA | Personal Digital Assistant |
| PLMN | Public Land Mobile Network |
| PRB | Physical Resource Block |
| vPRB | Virtualized Physical Resource Block |
| RAN | Radio Access Network |
| RAM | Random Access Memory |
| RET | Remote Electrical Tilt |
| RF | Radio-Frequency |
| RFI | Radio-Frequency Interference |
| RIC | Radio Intelligent Controller |
| RLF | Radio Link Failure |
| R/N | Relay Node |
| RNR | Reverse Noise Rise |
| ROM | Read-Only Memory |
| RRU | Remote Radio Unit |
| RSRP | Reference Signal Receive Power |
| RSRQ | Reference Signal Receive Quality |
| RSSI | Received Signal Strength Indicator |
| RU | Radio Unit |
| SINR | Signal-to-Interference-Plus-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications System |
| UTRAN | UMTS Radio Access Network |
| E-UTRAN | Evolved Universal Mobile Telecommunications System |
| WCD | Wireless Communication Device (interchangeable with UE) |
| WLAN | Wireless Local Area Network |
| XR | Extended Reality |

Further, various technical terms are used throughout this description. An illustrative resource that fleshes out various aspects of these terms can be found in Newton's Telecom Dictionary, 25th Edition (2009).

Furthermore, as used herein and noted below, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless telecommunications network employs a plurality of base stations to wirelessly transmit signals to a user device/user equipment (UE) and wirelessly receive signals from the user device. In a wireless communication system, there are many reasons why it may be desirable to configure message delivery options for short message service (SMS). For example, each time a UE enters a 5G network, it is registered to the SMS network function and the Unified Data Management (UDM) network function. The UDM generates authentication credentials, authorizes network access and other rights based on user subscriptions, and the like. Querying the UDM each time a UE enters a network creates unnecessary load on the UDM and unnecessary traffic on the network.

UEs can be distinguished as IMS-capable (e.g., voice-centric devices) and those that are not IMS-capable devices (e.g., data-centric devices). As will be described in further detail below, devices that are not IMS-capable rely on SMSoNAS as the primary messaging function/message delivery service. Devices that are IMS-capable rely on SMS over IMS (SMSoIMS) as the primary messaging function, with SMSoNAS being a backup messaging function. The present disclosure is directed to disabling the backup messaging function, i.e., SMSoNAS, for IMS-capable devices to reduce additional signaling and unnecessary load on the network and, specifically, the UDM.

Accordingly, a first aspect of the present disclosure is directed to a method for managing messaging functions. The method comprises receiving a first registration request from a user equipment (UE): accessing subscription data to confirm the UE is configured for short message service (SMS) function: determining the UE is IP Multimedia Subsystem (IMS)-capable; and disabling SMSoNAS messaging for the UE.

Yet another aspect of the present disclosure is directed to a non-transitory computer readable media having instructions stored thereon, that when executed by one or more computer processing components, cause the one or more computer processing components to perform a method comprising the steps of receiving a first registration request from a user equipment (UE): accessing subscription data to confirm the UE is configured for short message service (SMS) function: determining the UE is IP Multimedia Subsystem (IMS)-capable; and disabling SMS over Non-access stratum (SMSoNAS) messaging for the UE.

Another aspect of the present disclosure is directed to a system for managing messaging functions. The system comprises one or more processors and one or more computer storage hardware devices storing computer-usable instructions that, when used by the one or more processors, cause the one or more processors to receive a first registration request from a user equipment (UE): access subscription data to confirm the UE is configured for short message service (SMS) function: determine the UE is IP Multimedia Subsystem (IMS)-capable; and disable SMS over Non-access stratum (SMSoNAS) messaging for the UE.

Referring to FIG. 1, an exemplary computing device is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device. The computing device 100 may take many forms: non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 110 that directly or indirectly couples the following devices: memory 112, one or more processors 114, one or more presentation components 116, input/output (I/O) ports 118, I/O components 120, power supply 122, and radio(s) 124. Bus 110 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 120. Also, processors, such as one or more processors 114, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. Memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. One or more presentation components 116 presents data indications to a person or other device. Exemplary one or more presentation components 116 include a display device, speaker, printing component, vibrating component, etc. I/O ports 118 allow computing device 100 to be logically coupled to other devices including I/O components 120, some of which may be built in computing device 100. Illustrative I/O components 120 include a microphone, joystick, game pad, satellite dish, scanner, printer, wireless device, etc.

Radio 124 represents a radio that facilitates communication with a wireless telecommunication network. Radio 124 can be configured to support multiple technologies and/or multiple radios can be utilized to support multiple technologies. A wireless telecommunication network might include an array of devices, which are not shown so as to not obscure more relevant aspects of the invention. Components such as a base station, a communications tower, or even access points (as well as other components) can provide wireless connectivity in some aspects. Though a single radio is shown, it is expressly conceived that a computing device with a two or more radios (e.g., a first radio or a second radio) could facilitate communication over one or more wireless links with one or more wireless networks. Illustrative wireless telecommunications technologies include CDMA, GPRS, TDMA, GSM, and the like. Radio 124 may carry wireless communication functions or operations using any number of desirable wireless communication protocols, including 802.11 (Wi-Fi), WiMAX, LTE, 3G, 4G, LTE, 5G, NR, VOLTE, or other VoIP communications. As can be appreciated, in various embodiments, each of the radio 124 and any additional radio(s) can be configured to support multiple technologies and/or multiple frequencies. For example, radio 124 may be configured to communicate with a base station according to a cellular communication protocol (e.g., 4G, 5G, 6G, or the like), and a second radio may be configured to communicate with one or more other computing devices according to a local area communication protocol (e.g., IEEE 802.11 series, Bluetooth, NFC, z-wave, or the like).

Figure 2:
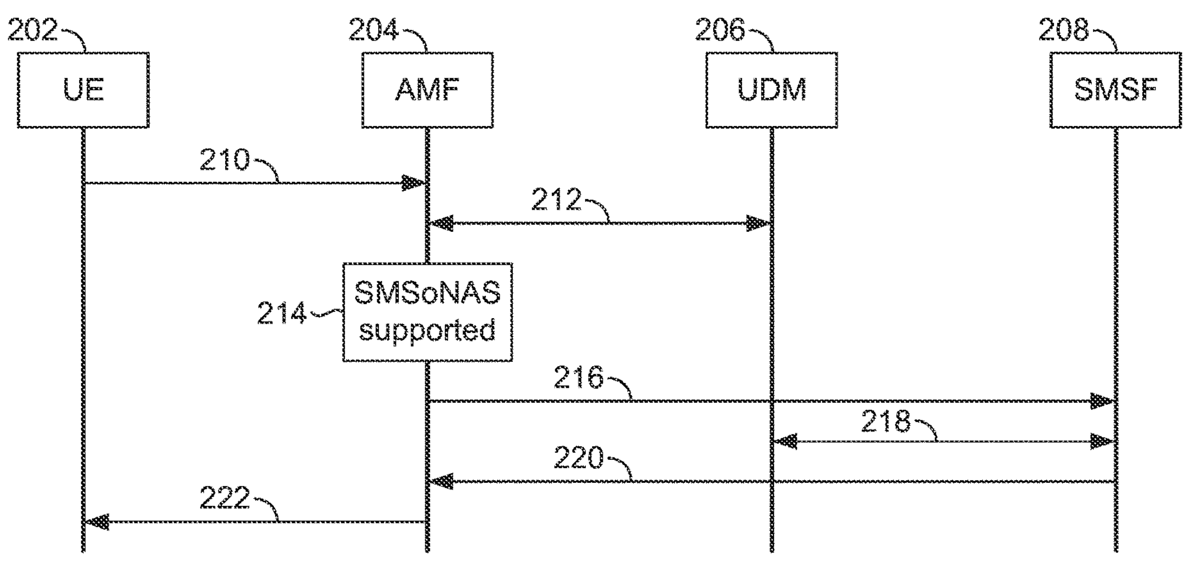
FIG. 2 depicts an exemplary configuration setup diagram of an aspect where user equipment is registered to a network, in accordance with aspects herein.

Turning now to FIG. 2, a representative configuration setup diagram is provided, illustrating a process flow for a system managing messaging functions. The diagram provided illustrates a present messaging configuration process that happens each time a UE registers to a network (e.g., a 5G network), without the benefit of the present invention. Currently, a UE 202 communicates a registration request to the Access Management Function (AMF) 204 at step 210. The AMF 204 will query the Unified Data Management function (UDM) 206 for subscription information every single time a UE communicates a registration request. This query, or retrieval of subscription information, is shown at step 212. The subscription information provided by the UDM 206 to the AMF 204 at step 212 can include whether a device is IMS-capable, whether the device is subscribed to SMS functions, the identity of the UE, type of requested information, etc. The information returned at step 212 can be known as Access & Mobility Subscription and Short Message Function Selection Subscription data. The AMF 204 handles registration management, allowing UEs to register/de-register with a network while the UDM 206 is the subscriber database holding all of the information necessary for the AMF 204 to perform its responsibilities.

In addition to querying the UDM 206 for the subscription information, the AMF 204 registers the UE on SMS function (SMSF) 208 at step 216. This may occur as a result of identifying a subscription flag in the data returned by the UDM 206. An exemplary subscription flag that may trigger this action can be as follows:

"smsSubsData": {"smsSubscribed":true}

Upon registering the device at step 216, the SMSF 208 retrieves a subscription for the UE 202 and subscribes the UE 202 for notifications at step 218. Step 220 illustrates that the SMSF registration is successful. The registration is accepted at step 222 and SMSoNAS is allowed or enabled. Registering with the UDM 206 and SMSF 208 each time a UE enters a network creates a large amount of traffic and load for the network. The repeated queries to the UDM 206 creates an unnecessary load on the UDM 206, as well.

Figure 3:
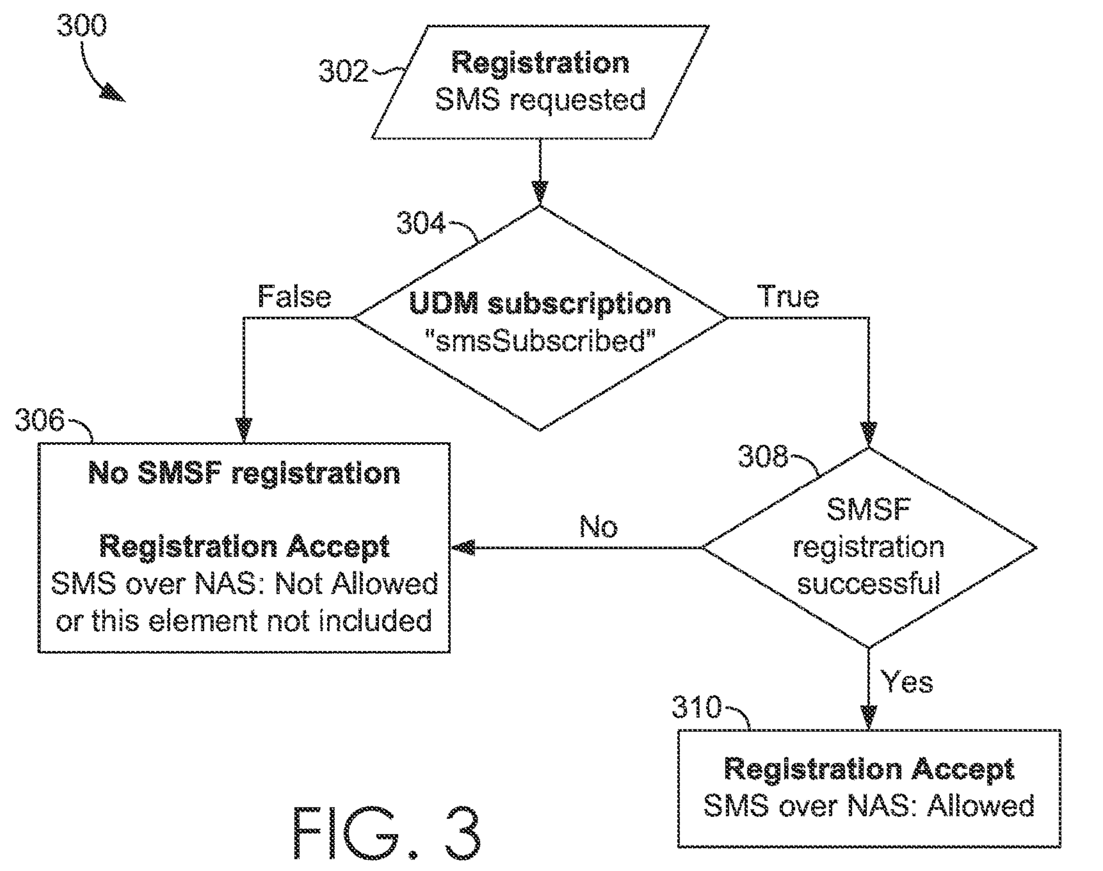
FIG. 3 depicts a flow diagram of an exemplary method corresponding to the configuration setup shown in FIG. 2, in accordance with aspects herein.

FIG. 3 provides an exemplary flow diagram 300 illustrating the configuration setup process shown in FIG. 2. Initially, a registration request is sent to the AMF at step 302. A determination is made at step 304 whether the UE is associated with subscription data (at the UDM). If there is no subscription data found, no SMSF registration is allowed at step 306. If subscription data is found, the flow moves on to SMSF registration at step 308. If the SMSF registration is not successful, SMSF registration is not allowed at step 306. If the SMSF registration is successful, the registration is accepted and SMSoNAS is allowed/enabled at step 310.

As previously mentioned, the processes described with respect to FIGS. 2 and 3 generate a tremendous load on the network and creates unnecessary traffic. Specifically, many UEs registered to the network are IMS-capable devices. For IMS-capable devices, SMSoNAS isn't the preferred messaging delivery method. Rather, SMSoIMS is preferred for IMS-capable devices. Thus, the network is registering an enormous number of UEs to SMSF that don't even use SMSoNAS for messaging, since they utilize SMSoIMS.

Figure 4:
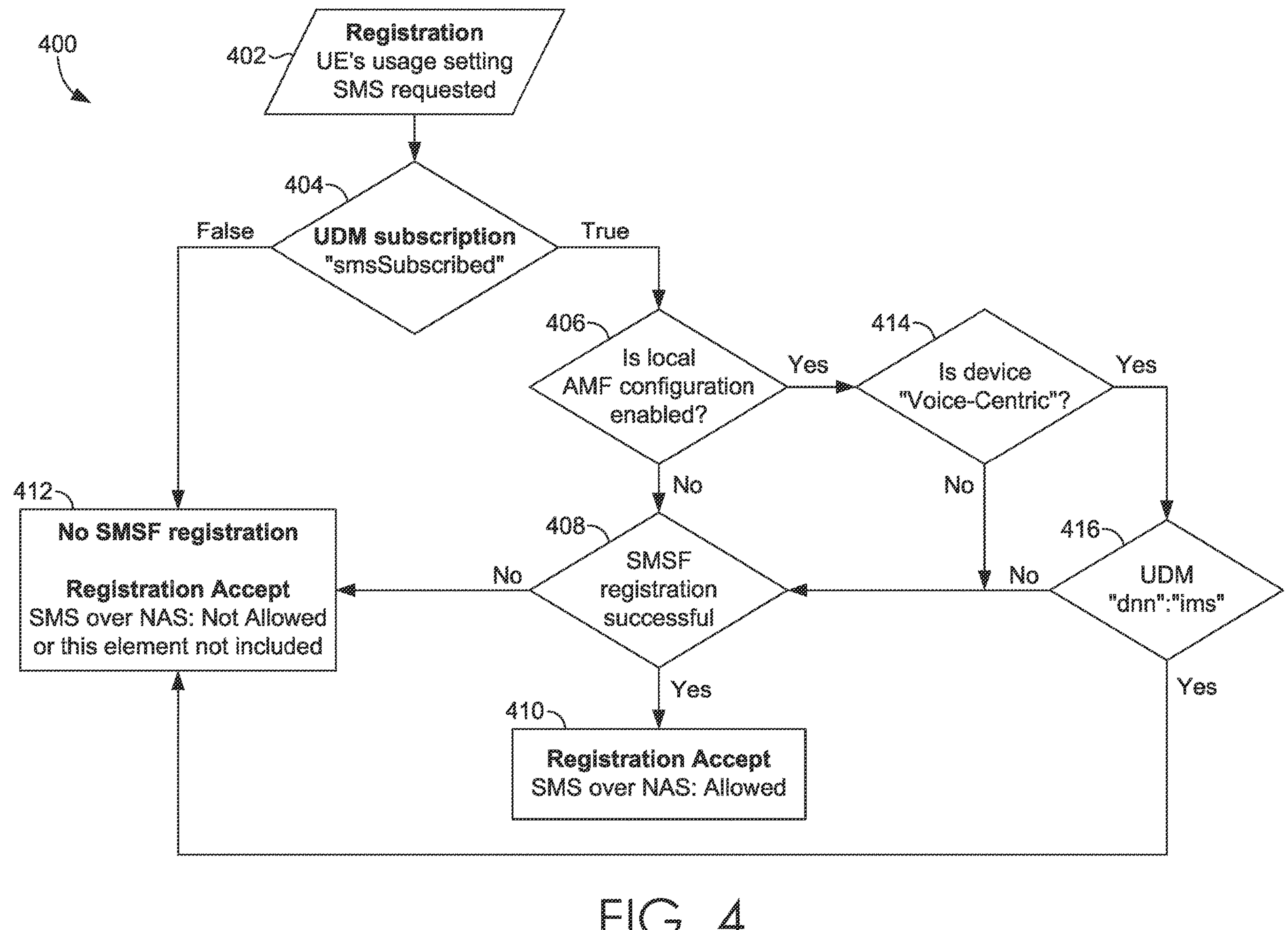
FIG. 4 depicts a flow diagram of an exemplary method, in accordance with aspects herein.

FIG. 4 depicts a flow diagram of an exemplary method for configuration setup where IMS-capability is leveraged to control network load. Initially, at step 402, a registration request is communicated from a UE. Subscription data is then received/retrieved at step 404. Recall that the subscription data may be leveraged from a UDM storing subscription information for all UEs. If there is no subscription information found at step 404, the method proceeds to step 412 where the registration to SMSF fails and SMSoNAS is not allowed/enabled. In other words, if the UE is not registered or subscribed to SMS functions, no SMSF registration can occur. Returning to step 404, if subscription information is identified, the method can proceed on to step 406, but step 406 is included as option and is not required for the utilization of the present invention. Step 406 queries whether local AMF configuration is enabled. This is a configurable parameter local to the AMF. This can include information whether SMSoNAS is supported and if the device is IMS-capable. If local configuration is not enabled, the method proceeds to step 408 with registration of the UE to SMSF. If the SMSF registration at step 408 is not successful, no SMSF registration occurs at step 412 and SMSoNAS is not enabled. If the SMSF registration at step 408 is successful, the registration is accepted and SMSoNAS is permitted/enabled at step 410.

Returning to step 406, if local AMF configuration is enabled, the method proceeds to step 414 and determines whether the device is voice-centric/voice-capable. As referenced herein, voice-centric devices are IMS-capable, while data-centric devices (i.e., not voice-centric) are not IMS-capable. If the device is not voice-centric, the method proceeds to step 408 with SMSF registration parameters. Note that data-only devices (i.e., data-centric) only support SMS delivery utilizing SMSoNAS. If the device is voice-centric, the method proceeds to step 416 to determine if the device is subscribed for IMS services. Step 416 can be managed by the UDM. As shown, if the device is not subscribed for IMS, the method proceeds to step 408 and attempts to register with SMSF to enable SMSoNAS. If the device is shown to be subscribed to IMS services at step 416, the method proceeds to step 412 so that SMSoNAS is not enabled. In other words, SMSoNAS can be disabled for the device since it is IMS-capable and subscribes to IMS services.

Figure 5:
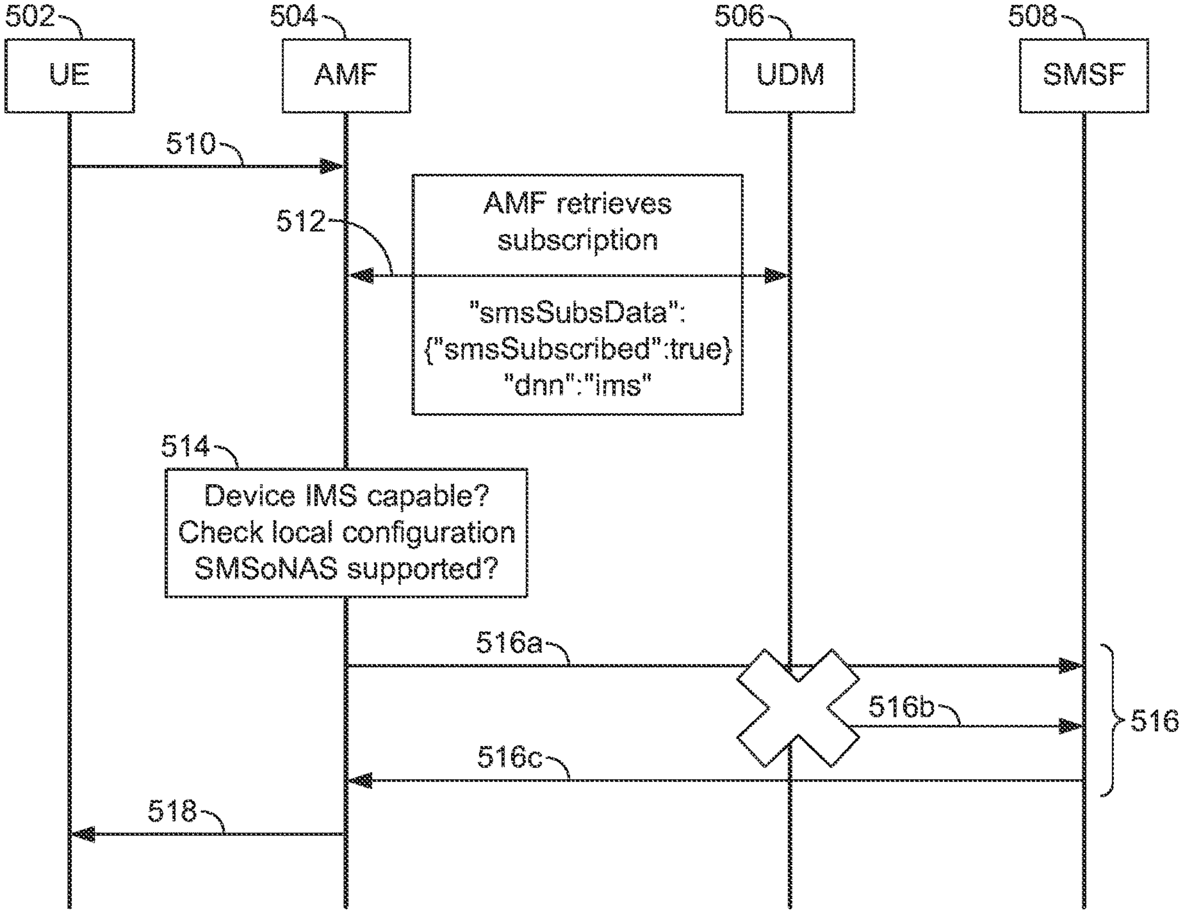
FIG. 5 depicts an exemplary configuration setup diagram of an aspect where IMS-capability is leveraged to control network load, in accordance with aspects herein.

Turning now to FIG. 5, an exemplary configuration setup diagram of an aspect where IMS-capability is leveraged to control network load is provided. This diagram will walk through the steps outlined above with respect to FIG. 4 to further explain how the system performs the steps and how load to the network is controlled. Initially, the UE 502 communicates a registration request to the AMF 504 at step 510. As with the previous process illustrated in FIG. 2, the subscription data is retrieved/received from the UDM 506 at step 512. The subscription information shown in this instance is that the UE 502 is subscribed to SMSF. Also noted, however, is that the UE is IMS-capable (e.g., the flag ""dnn":"ims"" indicates IMS-capability). This determination is made at step 514.

Once it is identified at step 514 that the UE 502 is IMS-capable, the system also identified that SMSoNAS is supported, which can be done using the local configuration at the AMF 504. This prevents additional unnecessary queries to the UDM 506 and SMSF 508. With this information, each subsequent step outlined in FIG. 2 can be eliminated. These eliminated steps 516 are illustrated in FIG. 5 as 516*a*, 516*b*, and 516*c*. Instead, the process skips directly ahead to step 518 and disables SMSoNAS for the IMS-capable device. As shown in FIG. 5, multiple queries to the UDM 506 are eliminated using this logic, as well as to the SMSF 508. This reduces load to the network, unnecessary signaling, etc.

Figure 6:
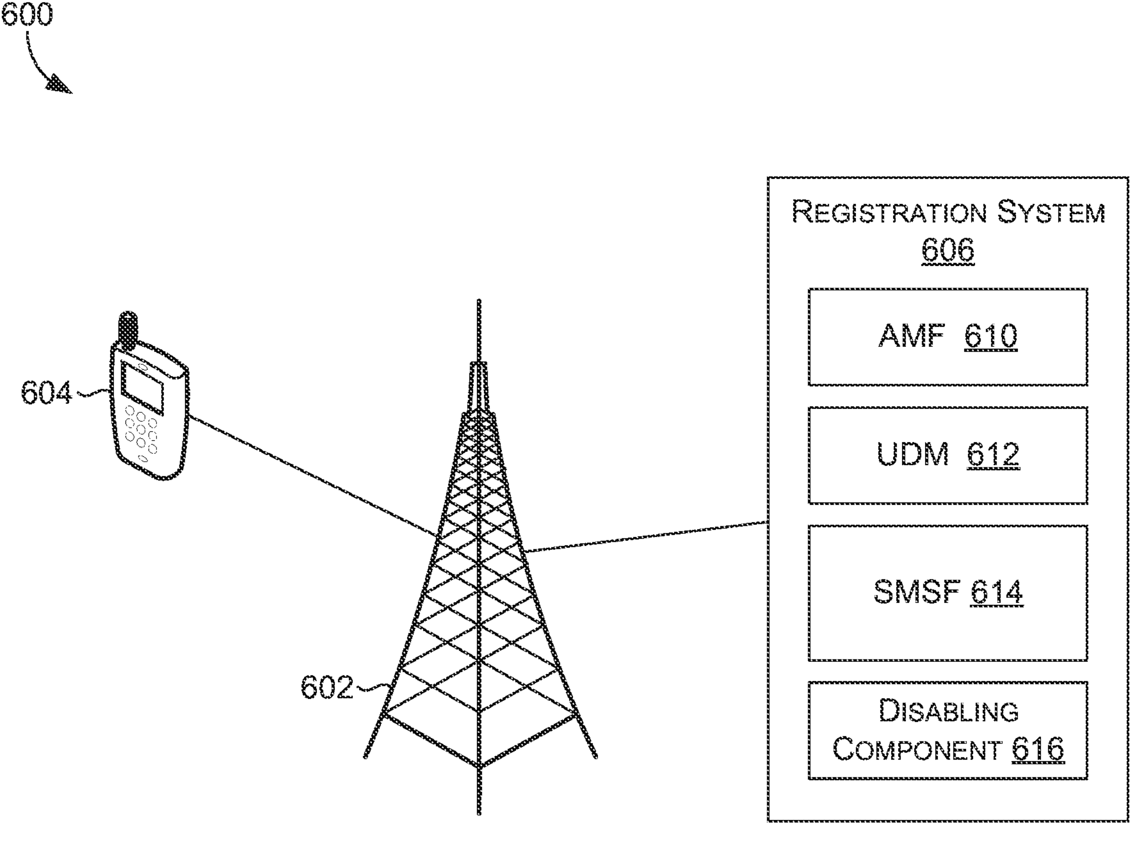
FIG. 6 depicts an exemplary network in which implementations of the present disclosure may be employed, in accordance with aspects herein.

Turning now to FIG. 6, an exemplary network environment 600 is illustrated. Such a network environment is illustrated and designated generally as diagram 600. Diagram 600 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated.

The network environment 600 generally represents a high-level model for wirelessly communicating between a base station and a fixed wireless access device, as discussed in greater detail herein. The network environment 600 comprises a base station 602 having one or more processors, a radio unit, and one or more antenna arrays, such as MIMO arrays. The base stations 602 can be communicatively coupled to a registration system 606. One or more user devices, such as UE 604, can connect to a telecommunications network through the base station 602 and its associated antenna array(s).

For the purposes of this disclosure, a base station is used in its general sense, being defined as a station for transmitting and/or receiving RF signals: accordingly, the at least one base station 602 may take the form of a cellular node (e.g. eNodeB, gNodeB, etc.), a relay, or any other desirable emitter and/or receiver of signals that remains fixed in place while a set of wireless signals are transmitted/received. A suitable base station is not protocol-specific, it may be configured to be any wireless telecommunication protocol that is compatible with the user device 604, such as 4G, 5G, 6G, or any other wireless standard. A suitable base station is also not exclusive to cellular telecommunication networks, it may take the form of any wireless communication system and used at any desirable frequency (e.g., microwave relays). Base stations consistent with the present disclosure may be configured to serve a certain geographic area (i.e., a cell) and will have one or more backhaul connections that connect it to a broader telecommunications network for the provision of telecommunication service to the user device 604. As illustrated, the base station 602 may take the form of a macro cell; however, the base station 602 may take any desirable form, such as a small cell. Base stations suitable for use in the present disclosure may be terrestrial, that is, they are coupled to the earth via a tower or some other structure, such as the base station 602: alternatively, a suitable base station may be extra-terrestrial, that is coupled to an aircraft or a satellite.

Though each user device in FIG. 6 is illustrated as using a single base station, the network environment 600 may comprise multiple base stations, including multiple base stations that serve the same user device 604, such as through the use of dual connectivity technology: further, additional base stations may provide overlapping or auxiliary coverage in the event an outage occurs at the base station 602. Each base station of the network environment 600, including the base station 602, comprises one or more antennas that propagate to or receive signals from the air interface or through space. The one or more antennas of the base station 602 may take any desirable form, configured for the particular types of signaling between the base station 602 and the user device 604, including omni-directional, dipoles, single antenna systems, antenna arrays such as multiple-input, multiple-output (MIMO) and single-input, single-output (SISO) arrays, massive MIMO, and many others.

The network environment 600 further comprises at least one user device 604. The user device 604 may be said to include any one or more components of the computing device 100 of FIG. 1. Generally, the user device 604 provides wireless connectivity between the user device 604 and the base station 602.

The network environment 600 further comprises a registration system 606. The registration system 606 can include an AMF 610, UDM 612, SMSF 614, and a disabling component 616. Each of these components have been described at length above with respect to FIGS. 2-5. As noted above, the AMF 610 handles registration management, allowing UEs to register/de-register with a network, such as a 5G system. The AMF 610 can also store data from the UDM 612 and the SMSF 614, and request to be notified when there is any change to the data. This data is part of a local configuration at the AMF 610 that can be referenced to avoid queries to the UDM 612 and the SMSF 614. Each time a UE enters 5G, it must be registered to the UDM 612 and SMSF 614 to enable SMSoNAS.

The UDM 612 is a subscriber database that includes all subscription data for UEs. As noted, this data can also be stored at the AMF 610 and updated when changes are made at the UDM 612. The subscription data is shared by the UDM 612 with the AMF 610 when the AMF 610 queries the UDM 612 as a result of a registration request from a UE, such as UE 604. The subscription data can include information on whether the UE is IMS-capable and whether the UE is subscribed to SMSF 614.

The SMSF 614 supports SMSoNAS as defined in 3GPP TS 23.501. This is the preferred messaging function for data-centric devices. SMSoNAS is a backup function for voice-centric devices, or IMS-capable devices.

The disabling component 616 can disable the SMSoNAS function in a number of instances. SMSoNAS may be disabled when the UE is identified as IMS-capable. SMSoNAS may be disabled when the UE is not subscribed to SMS functions. The disabling of the SMSoNAS function can be communicated to the UE 604, the base station 602, or any other configured end point. In aspects, the disabling component 616 is a configurable option at the AMF 610 to control SMS delivery for IMS-capable devices, avoiding additional signaling and capacity impact towards SMSF 614 and UDM 612.

Figure 7:
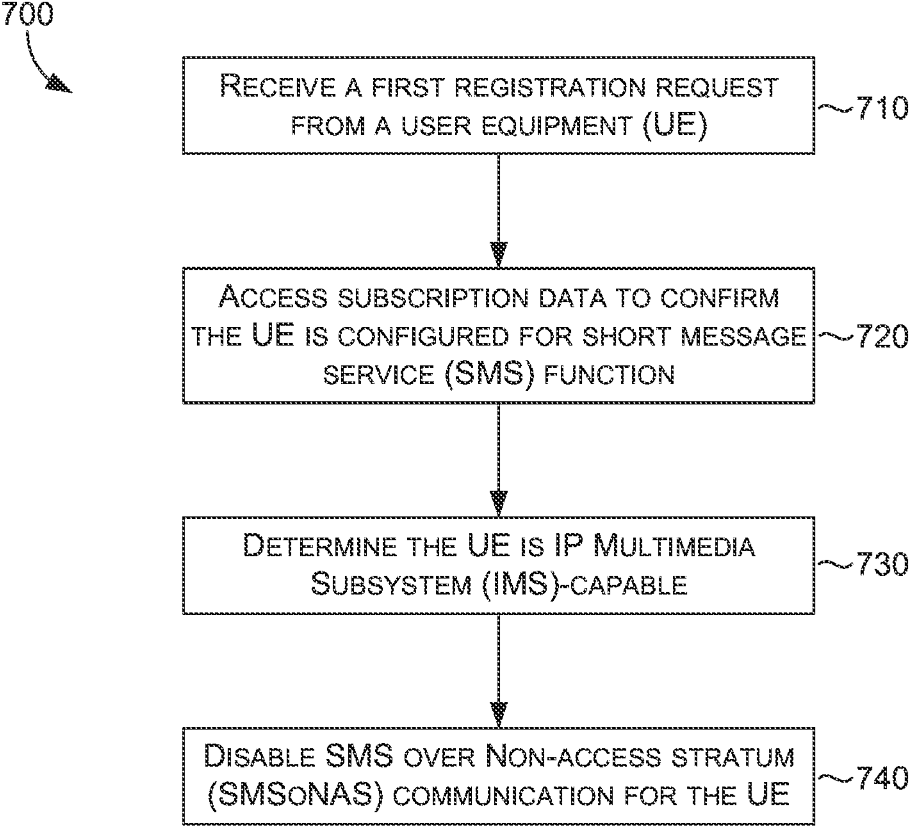
FIG. 7 depicts a flow diagram of an exemplary method, in accordance with aspects herein.

Turning now to FIG. 7, an exemplary flow diagram of an exemplary method 700 is provided. At a first step 710, a first registration request from a UE is received. Subscription data is accessed to confirm that the UE is configured for SMS function at step 720. It is then determined at step 730 that the UE is IMS-capable. Upon determining the UE is IMS-capable, SMSoNAS is disabled for the UE at step 740.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for managing messaging functions, the method comprising:

receiving a first registration request from a user equipment (UE);

determining the UE is IP Multimedia Subsystem (IMS)-capable; and based on determining that the UE is IMS-capable, disabling SMS over Non-access stratum (SMSoNAS) messaging for the UE that is IMS-capable without registering the UE with a Short Message Service Function (SMSF).

2. The method of claim 1, further comprising communicating with the UE via SMS over IMS (SMSoIMS).

3. The method of claim 1, further comprising, accessing subscription data from a Unified Data Management (UDM) function.

4. The method of claim 1, further comprising accessing a local configuration to disable SMSoNAS.

5. The method of claim 1, further comprising registering the UE for the SMS function when the local configuration option to disable SMSoNAS is not enabled.

6. The method of claim 1, further comprising registering a second UE that is not IMS-capable for the SMS function.

7. The method of claim 6, wherein data-centric devices are not IMS-capable.

8. The method of claim 1, wherein voice-centric devices are IMS-capable.

9. The method of claim 1, wherein the first registration request includes an indication of whether the UE is voice-centric or data-centric.

10. A non-transitory computer readable media having computer-readable instructions stored thereon that, when executed by one or more computer processing components, cause the one or more computer processing components to perform a method comprising:

receiving a first registration request from a user equipment (UE);

determining the UE is IP Multimedia Subsystem (IMS)-capable; and based on determining that the UE is IMS-capable, disabling SMS over Non-access stratum (SMSoNAS) messaging for the UE that is IMS-capable without registering the UE with a Short Message Service Function (SMSF).

11. The non-transitory computer readable media of claim 10, wherein the method further comprises communicating with the UE via SMS over IMS (SMSoIMS).

12. The non-transitory computer readable media of claim 10, wherein the method further comprises accessing a local configuration to disable SMSoNAS.

13. The non-transitory computer readable media of claim 10, wherein the method further comprises registering the UE for the SMS function when the local configuration option to disable SMSoNAS is not enabled.

14. A system for managing messaging functions comprising:

one or more processors; and one or more computer storage hardware devices storing computer-usable instructions that, when used by the one or more processors, cause the one or more processors to:

receive a first registration request from a user equipment (UE);

determine the UE is IP Multimedia Subsystem (IMS)-capable; and based on determining that the UE is IMS-capable, disabling SMS over Non-access stratum (SMSoNAS) messaging for the UE that is IMS-capable without registering the UE with a Short Message Service Function (SMSF).

15. The system of claim 14, wherein the one or more processors communicate with the UE via SMS over IMS (SMSoIMS).

16. The system of claim 14, wherein the method further comprises accessing a local configuration to disable SMSoNAS.

17. The system of claim 14, wherein the first registration request includes an indication of whether the UE is voice-centric or data-centric.

18. The system of claim 14, wherein the one or more processors register a second UE that is not IMS-capable for the SMS function.

* * * * *